United States Patent Office 2,821,503
Patented Jan. 28, 1958

2,821,503

PURIFICATION OF METHANOL

Louis G. Willke and Carroll G. Cullen, Barnsdall, Okla., assignors to Cities Service Oil Company, Bartlesville, Okla., a corporation of Delaware No Drawing. Application February 10, 1953
Serial No. 336,206

8 Claims. (Cl. 202—57)

This invention relates to the purification of methanol, and more particularly to the removal of close-boiling carbonyl and acetal impurities from methanol.

Synthetic methanol, such as that produced in processes for the oxidation of normally gaseous hydrocarbons, is almost invariably contaminated by trace quantities of impurities which impart an off odor, and cause the methanol to fail the permanganate and sulfuric acid tests for oxidizable and carbonizable materials. These impurities are primarily carbonyls, formals, and acetals, and in the aggregate they may amount to from about 0.1% to several percent, depending on the synthesis process and the manner in which the methanol fraction is recovered from the synthesis products. Particularly troublesome are the impurities having boiling points so close to that of methanol that they cannot be removed from the methanol by ordinary fractional distillation, even at reflux ratios well in excess of 20:1.

We have discovered that a crude synthetic methanol may be freed of its close-boiling carbonyl, formal, and acetal impurities by treatment with an alkali halate or halite treating agent and sulfuric acid, followed by a fractional distillation to take overhead materials boiling below the boiling point of methanol. It has been found that the overhead fraction from this distillation, which will generally amount to from about 2 to about 5 percent of the methanol charged, contains substantially all the impurities contained in the crude methanol, either unchanged or in the form of chlorinated derivatives, and that a methanol meeting all C. P. or U. S. P. tests may be recovered from the neutralized bottoms by a second fractional distillation.

In practising our invention, we prefer to add the solution of treating agent to the methanol to be purified, followed by the addition of 66° Bé. sulfuric acid, preferably in the amount of about four mols of acid per mol of treating agent. Lower molar ratios down to about 2:1 may be used, but the process is most efficient when the molar ratio of acid to chlorate is 4:1 or greater.

The following table shows the results of a number of experimental runs made according to the procedure described above on 100 cc. batches of methanol contaminated with dimethyl acetal and acetone in varying amounts, and using various amounts of treating agent, the mol ratio of acid to agent being in all cases about 4:1. Saturated aqueous solutions of treating agent were used in all runs except 7 and 8. $KM_nO_4$ time was determined by mixing a sample of the methanol with an equal volume of an aqueous solution containing 0.2 gram of potassium permanganate per liter, and noting the time required for the solution to lose its purple color. In all cases where the $KM_nO_4$ time was 30 minutes or longer, the recovered methanol was free from sulfuric acid color, and corresponded in every way to a C. P. or U. S. P. methanol.

Table I

| Run No. | Impurities in the methanol | | Treating agent and amount in grams | 66° Bé. $H_2SO_4$ (cc.) | Treated methanol $KM_nO_4$ Time (minutes) |
|---|---|---|---|---|---|
| | Percent DMA | Percent Acetone | | | |
| 1 | 0.6 | 0.2 | $KClO_3$ 0.5 | 1.2 | 50 |
| 2 | 0.6 | 0.2 | $KClO_3$ 0.25 | 0.6 | 30 |
| 3 | 0.6 | 0.2 | $KClO_3$ 1.0 | 2.4 | over 50 |
| 4 | 1.5 | 0.3 | $KClO_3$ 1.0 | 2.4 | over 30 |
| 5 | 1.5 | 0.3 | $KClO_3$ 0.25 | 0.6 | over 30 |
| 6 | 0.5 | | $KClO_3$ 0.15 | 0.4 | over 30 |
| 7 | 0.5 | 0.1 | $KClO_3$ ¹ 0.20 | 0.5 | 30 |
| 8 | 0.5 | 0.1 | $KClO_3$ ² 0.20 | 0.5 | 0 |
| 9 | 0.5 | 0.1 | $NaClO_3$ 0.5 | 1.2 | over 30 |
| 10 | 0.5 | 0.1 | $Ca(OCl)_2$ 1.0 | 2.4 | 2 |
| 11 | 0.5 | 0.1 | $KM_nO_4$ 3.0 | 5.0 | 0 |

¹ 2.5 g. $KClO_3$ per 100 cc. sol.
² 1.25 g. $KClO_3$ per 100 cc. sol.

The concentration of treating agent in the aqueous solution added to the methanol appears to be somewhat critical, since if the concentration is less than about 2% by weight, apparently the reaction is drowned out and the desired clean-up of impurities is not obtained. In general, we prefer to use a concentration of at least 2.5% by weight. For example, in run No. 7, above, a U. S. P. methanol was obtained by treating 100 cc. of methanol containing 0.6% impurities with 0.2 g. of $KClO_3$ in a 2.5% solution, whereas in run No. 8, no clean-up, as evidenced by $KM_nO_4$ time, was obtained by treating the same methanol with the same amount of $KClO_3$, but in a 1.25% solution.

The amount of treating agent used is very small in comparison to the amount of impurities present, and may be as small as one tenth mol of agent per mol of impurities, as evidenced in run 5 of the table. It is preferable to use somewhat greater amounts than this, however, to insure a complete removal of undesirable contaminants.

It has been found that only the alkali halates and halites are suitable for use in the process. As may be seen from run 10 of the foregoing table, a hypochlorite such as calcium hypochlorite is ineffective to remove the impurities. Perchlorates also appear to be ineffective, potassium perchlorate having been used without success in amounts up to three times that required when potassium chlorate is used. While a commercial process for cleaning up alcohols by means of our new process would probably be limited, from a cost standpoint, to the use of chlorates and chlorites, we have tested potassium iodate and bromate, and have obtained as good results as when using the chlorate. The effective agent in our process is apparently halogen dioxide liberated by the reaction of the halate or halite with the added sulfuric acid. The halogen dioxide does not necessarily have to be formed in the presence of the methanol, since equally good results have been obtained by treating the methanol with an aqueous solution of halogen dioxide.

The results in the foregoing table were obtained on methanol containing controlled amounts of dimethyl acetal and acetone. The process has been proven of equal applicability in the purification of crude methanol produced by the controlled partial oxidation of normally gaseous hydrocarbons, and containing from about 0.2 to 0.5% congeneric carbonyl and acetal impurities of undetermined constitution. In treating such alcohols, our procedure is to add about 0.075 gram of sodium chlorate in saturated aqueous solution and about 0.2 ml. of 66° Bé. sulfuric acid per 100 ml. of methanol, and to continuously remove material boiling below methanol by fractional distillation at a reflux ratio of about 19:1, this lower boiling overhead cut amounting to about 2.5% of the methanol charged. The bottoms are then neutralized with caustic soda and passed to another fractionator from which a methanol which will pass U. S. P. or government specifications is removed as an overhead fraction, the bottoms being an aqueous solution of sodium sulphate.

The mechanism by which the impurities are rendered capable of being removed by fractionation by our new process is not known. It is apparently not due to oxidation of the impurities by the halide dioxide or other halide oxy acids released by the reaction of the treating agent with sulfuric acid, since powerful oxidizing agents such as calcium hypochlorite and potassium permanganate are ineffective in cleaning up the alcohol, as may be observed from runs 10 and 11 of the table. Furthermore, no gums or high boiling organic compounds are found in the bottoms from the distillation in which the purified alcohol is recovered, as would be expected if the impurities were oxidized. It may be that some of the impurities are halogenated to some extent, and that the halogenated compounds form azeotropes with the remaining impurities, permitting them to be fractionated from the reaction mixture. It is also possible that halide dioxide present in some way lessens the association of the impurities with the methanol molecules. In any event, no matter what the mechanism of the reaction may be, it is possible by the use of my new process to recover alcohols meeting all C. P. and U. S. P. tests from highly contaminated crudes.

Having now described my invention, what is claimed is:

1. The process of purifying methanol comprising treating a crude methanol containing impurities of the type of carbonyls, formals and acetals, with a mineral acid and an aqueous solution of a treating agent selected from the group consisting of alkali metal chlorates, bromates, iodates, and chlorites, the concentration of the treating agent in the aqueous solution being at least about 2% by weight, subjecting the mixture to a first fractional distillation to take overhead a fraction containing substantially all the impurities present, subjecting the bottom fraction from the first fractional distillation, after neutralization, to a second fractional distillation, and recovering substantially purified methanol as an overhead fraction from the second fractional distillation.

2. The process according to claim 1 in which at least 0.1 mol of treating agent is employed per mol of impurities.

3. The process accoring to claim 1 in which the molar ratio of acid to treating agent is at least about 4:1.

4. The process according to claim 1 in which at least 0.1 mol of treating agent is employed per mol of impurities, the concentration of treating agent in the aqueous solution is at least about 2% by weight, and the molar ratio of acid to treating agent is at least about 4:1.

5. The process of purifying methanol comprising treating a crude methanol containing close-boiling impurities of the type of carbonyls, formals and acetals, with sulfuric acid and an aqueous solution of sodium chlorate, the concentration of said chlorate in the aqueous solution being at least about 2% by weight, subjecting the mixture to a first fractional distillation to take overhead a fraction containing substantially all the impurities present, subjecting the bottom fraction from the first fractional distillation, after neutralization, to a second fractional distillation, and recovering substantially purified alcohol as an overhead fraction from the second fractional distillation.

6. The process according to claim 5 in which at least 0.1 mol of sodium chlorate is employed per mol of impurities.

7. The process according to claim 5 in which the molar ratio of acid to chlorate is at least 2:1.

8. The process according to claim 5 in which at least 0.1 mol of chlorate is employed per mol of impurities, the concentration of chlorate in the aqueous solution is at least 2% by weight, and the molar ratio of acid to chlorate is about 4:1.

References Cited in the file of this patent

UNITED STATES PATENTS

| | | |
|---|---|---|
| 112,725 | Lugo | Mar. 14, 1871 |
| 736,098 | Highton | Aug. 11, 1903 |
| 1,601,404 | Mann et al. | Sept. 28, 1926 |
| 1,936,836 | Gorhan | Nov. 28, 1933 |
| 1,987,601 | Burke | Jan. 15, 1935 |
| 2,083,856 | Moravec et al. | June 15, 1937 |
| 2,576,030 | Morrell et al. | Nov. 20, 1951 |

FOREIGN PATENTS

| | | |
|---|---|---|
| 36,827 | Germany | Aug. 6, 1886 |
| 112,166 | Great Britain | Dec. 28, 1917 |
| 500,745 | Great Britain | Feb. 15, 1939 |